May 2, 1950 — D. E. JACK — 2,505,968
SHAFT SEAL AND METHOD OF EFFECTING THE SEAL
Filed May 6, 1947 — 2 Sheets-Sheet 1
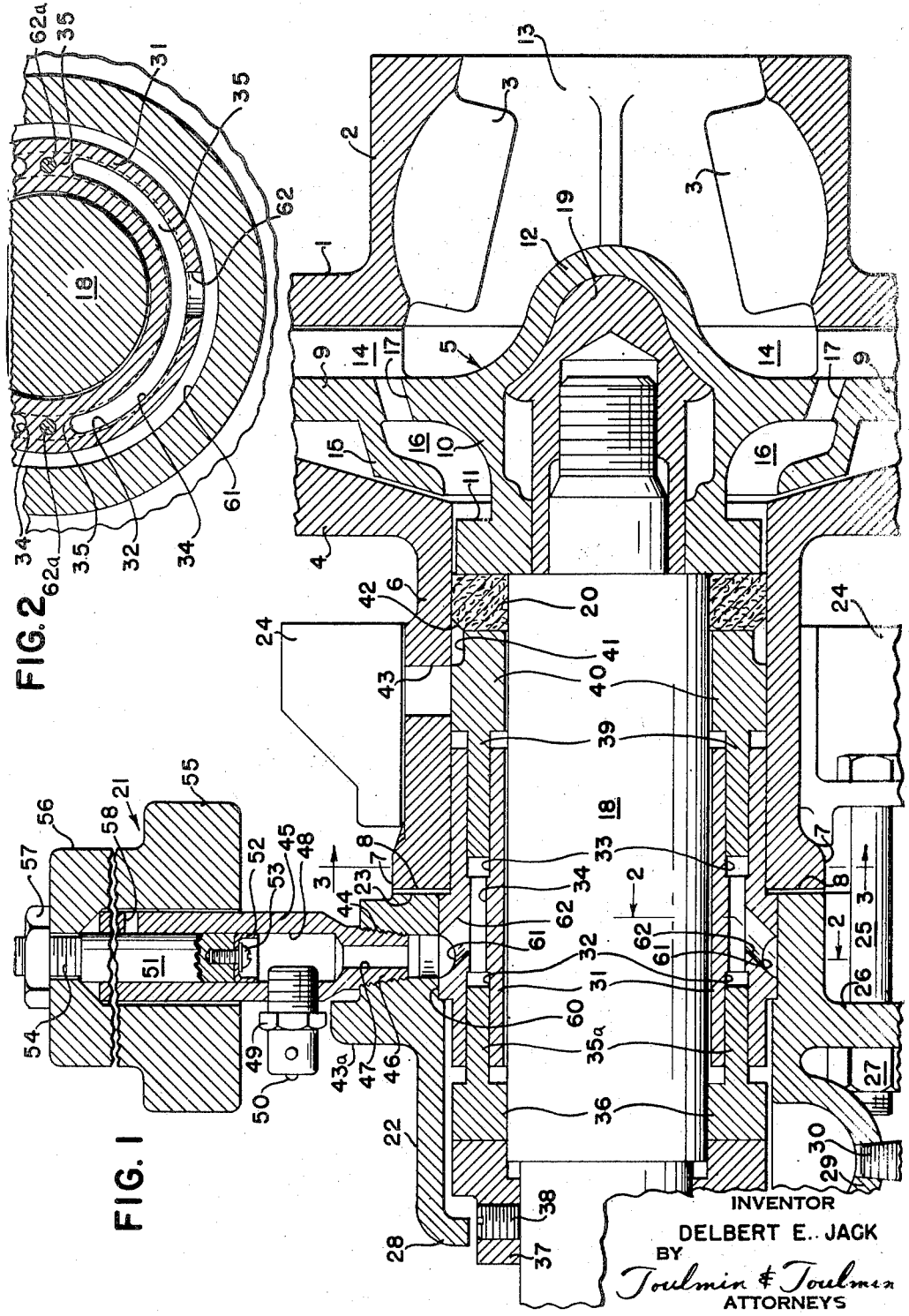
INVENTOR
DELBERT E. JACK
BY
Toulmin & Toulmin
ATTORNEYS May 2, 1950  D. E. JACK  2,505,968
SHAFT SEAL AND METHOD OF EFFECTING THE SEAL
Filed May 6, 1947  2 Sheets-Sheet 2

INVENTOR
DELBERT E. JACK
BY
Toulmin & Toulmin
ATTORNEYS

Patented May 2, 1950

2,505,968

UNITED STATES PATENT OFFICE 2,505,968

SHAFT SEAL AND METHOD OF EFFECTING THE SEAL

Delbert E. Jack, New York, N. Y., assignor to The Duriron Company, Inc., Dayton, Ohio, a corporation of New York Application May 6, 1947, Serial No. 746,199

7 Claims. (Cl. 103—111)

The present invention relates to seals for preventing creepage of high pressure fluid along rotary and flat surfaces. In rotary pressure apparatus, such as pumps, the problem exists of preventing creepage of fluid away from the compartment in which pressure is applied to the fluid. The difficulties of obstructing this fluid are enhanced in proportion to the magnitude of the pressure differentials. In certain types of impeller pumps, for example which handle corrosive fluids, it is necessary to prevent the fluid from leaking out of the pump casing and travelling along the impeller shaft toward the bearings. All parts of the pump which come into contact with the corrosive liquid are usually fabricated of non-attackable metal such as silicon iron. But a metal of this character is so hard as to be practically unmachineable. The remaining parts of the pump and the impeller bearings are usually made of a machineable metal such as wrought iron, cast iron or steel which is susceptible to attack by acid so that considerable precaution must be exercised to prevent the acid from reaching these parts.

It has been proposed heretofore, to employ for an effective seal an acid-resistant anti-friction member such as graphite which is pressed against a rotating part of the shaft at a suitable position in order to prevent longitudinal and radial creepage of the acid which might otherwise reach the bearings in which the shaft is journaled. For this purpose, either the shaft is provided with a shoulder against which the member bears, or else the latter is caused to contact with a ring-like projection formed on the impeller. In either case, pressure is usually exercised longitudinally of the shaft against the member so as to prevent any radial leakage at the thrust bearing surface. Various devices, including compression springs, have been employed to apply this longitudinal pressure but it has been found that unless strong springs are used with their attendant friction between the rotating and stationary parts, small but not negligible amounts of fluid leak pass the graphite member. This leakage fluid, unless absorbed or stopped, might eventually reach the bearings of the shaft and do damage thereto. This is particularly true in case the pressure developed by the centrifugal pump is exceedingly high which causes the liquid to find even the slightest avenue of escape and obviously, even if the leakage is not present when the pump is new, the wear at the various parts may give rise to this loss of fluid.

In order to improve the liquid-obstructing property of the seal at the rear of the pump casing, the art has devised various ways of applying packing for absorbing the fluid which creeps past the graphite sealing ring but this method is not altogether satisfactory because the packing in time needs renewal and the seal structure may have to be dismantled for this purpose. Again, it has also been proposed to introduce longitudinal pressure against the sealing ring by means of a hydrostatic device which automatically serves to introduce precisely the same pressure to all parts of the sealing ring. This arrangement represented an improvement over the earlier types of devices and is satisfactory in operation. Nevertheless, as pumps grew in size and now operate at much higher pressures it was found that the single sealing ring, even when hydrostatic pressure was applied thereto was not altogether sufficient to stop the last particle of fluid leakage along the shaft. It will be appreciated that even the smallest amount of corrosive fluid which may eventually reach the bearings or other delicate mechanism may in time do considerable damage.

The primary object of my invention is further to improve the sealing properties of the structure interposed between a pump and its bearings for preventing even the least drop or particle of fluid from reaching the bearings.

Still another object is to provide an improved form of shaft seal, particularly useful in connection with centrifugal pumps having corrosive fluids in which a constant pressure is uniformly exercised against the parts of the seal in order to prevent radial and longitudinal leakage and without employing any packing material.

A further object is to provide an improved shaft seal in which not only the usual graphite form of sealing member is used but also a second sealing surface which adds its sealing effect to that obtained by the graphite sealing method.

Another object is to provide a shaft seal in which two or more sealing surfaces are employed, including the usual graphite seal, and in which pressure is exercised uniformly at each of the sealing surfaces so that each seal carries its part of the sealing load and every part of each seal is subjected to the same pressure.

In carrying out the above objects, a pair of spaced sealing surfaces is employed and hydrostatic pressure is exerted equally against each of the sealing surfaces and against each part of the individual seals. The improvement includes the use of a cylindrical link member formed in two or more parts and adapted to be expanded endwise by hydrostatic pressure so as to apply equal forces against the inner surfaces of a pair of thrust collars which are secured to the rotating part of the pump. While it is preferable to eliminate the use of springs and similar devices for producing pressure, also the use of packing material to absorb any leakage fluid, either in vapor or liquid form, the structure of this invention can be sometimes advantageously used in combination with such springs and packing materials.

The invention will be better understood when reference is made to the following description and the accompanying drawings in which:

Fig. 1 represents a longitudinal section of the improved seal together with the constant pressure-producing structure and applied to a typical form of centrifugal pump. This section has been taken along line 1—1 in Fig. 3 but the various shafts have been shown in elevation for clearness.

Fig. 2 represents a fragmentary cross-sectional view showing the lower portion of the seal structure at the position 2—2 in Fig. 1.

Figure 3:
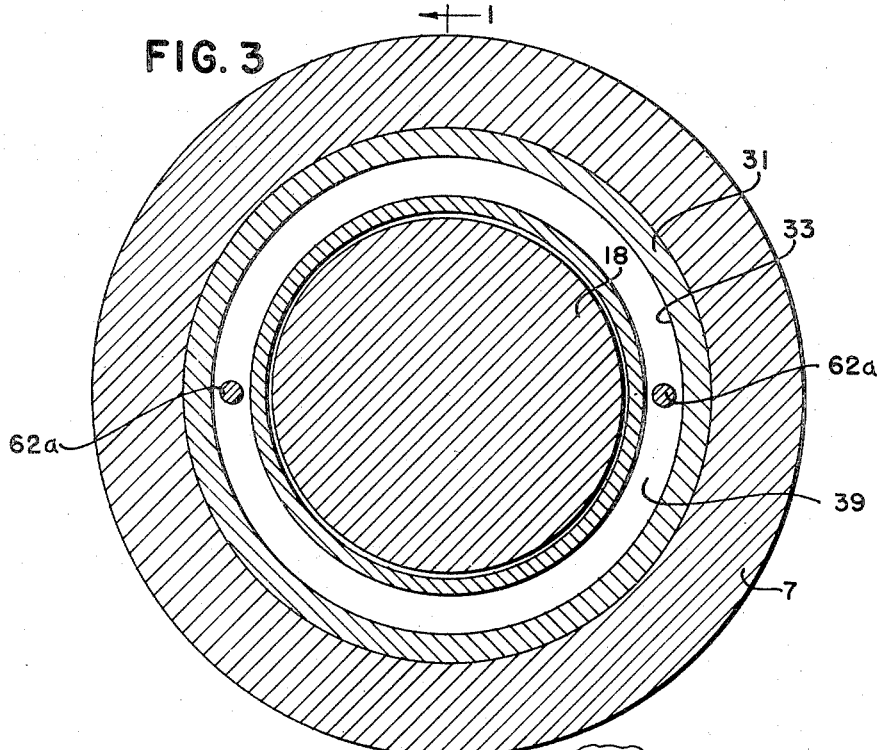
Fig. 3 is a transverse sectional view of the improved seal and taken along the line 3—3 in Fig. 1.
Figure 4:
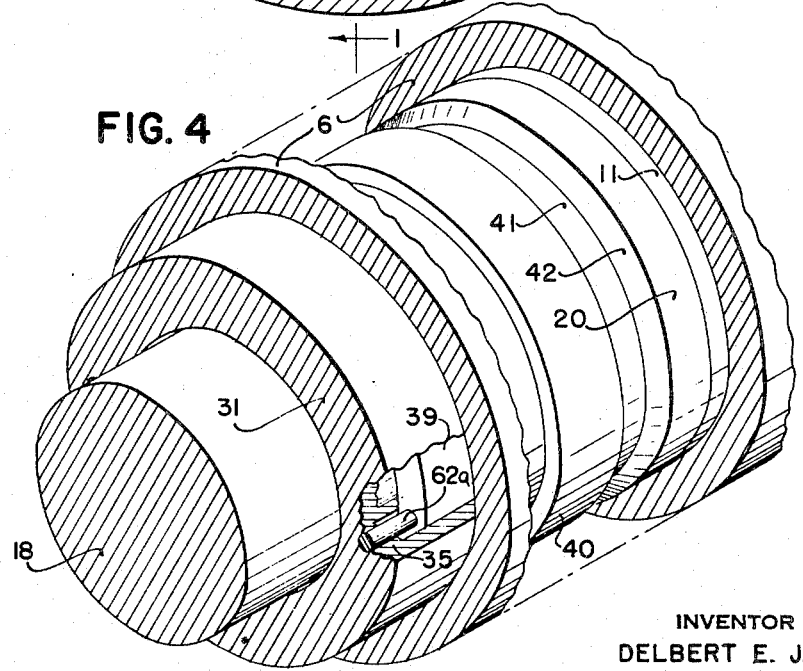
Fig. 4 is a perspective view of a portion of the seal structure, showing the manner in which some of the parts are prevented from rotating.

Referring to Fig. 1, reference character 1 designates the front half casing of the pump and is provided with a cylindrical projection 2 constituting the inlet and having swirl straightening members 3 extending along the inner bore. The rear portion of the pump casing is designated 4 and is clamped, or in any other manner secured to the casing portion 1. The outlet (not shown) of the pump is formed at the peripheral edge of the casing portion 4 and an impeller generally indicated at 5 is contained within the casing for drawing fluid through the inlet 2 and expelling the same under pressure through the outlet. The casing portion 4 is extended longitudinally to the rear to form a cylinder 6 which terminates in an enlarged outwardly extending flange portion 7 having a flat edge 8.

The impeller may comprise a radially extending web 9 which merges at the center into a hollow hub 10 terminating at the shaft in a thrust collar 11. This collar has a diametrical size slightly less than the bore of the cylindrical member 6 so as to eliminate friction when the impeller is rotated. The web 9 is also provided with a conically shaped thin walled portion 12 which extends into the inlet opening 13. The blades 14 which may take the shape of an involute are equidistantly spaced about the web, and in practice are usually cast integral therewith. The height of the blades is slightly less than the distance between the web 9 and the inner surface of the casing portion 1 so that the webs will not contact the casing. The casing portion 4 is given an inclined or conical configuration and there is a flange portion 15 integrally secured to the rear surface of the web 9, this portion also extending inwardly following the same direction as a conical shaped wall of the casing portion 4, but out of contact therewith. There are a number of vanes 16 extending between the inner surface of the flange portion 15 and the hub portion 10. The function of these blades will be explained hereinafter.

A series of holes extend through the web portion 9, and are positioned between the flange portion 15 and the hub portion 10. The impeller 5 is mounted on and carried by a shaft 18, which is provided at one end with a pair of shouldered portions, one of which is threaded. Any suitable form of connection can be employed to join the threaded end of the shaft and the impeller, but as illustrated, this securing means may take the form of a liner 19, cast within the walled portion 12 and constituted of a readily fusible metal. This liner is bored out to receive the end portion of the shaft and is threaded.

The shaft is journaled within a pair of bearings (not shown), preferably of the ball-bearing type so that the impeller overhangs the bearings. A motor, or other prime mover may be employed to rotate the shaft at high speed. When the impeller 5 is rotated, a suction is created at the inlet 13 by which to draw fluid through the inlet from any source, and this fluid passes radially outward through the spaces of the blade 14 and is discharged at the outlet (not shown) in the form of a high velocity stream. As the impeller rotates a certain amount of fluid escapes to the rear of the impeller due to leakage, and some of this fluid flows past the flange portion 15 and would normally travel along the interior of the cylinder 6, and eventually reach the bearings of the shaft 18. However, the blades 16 which move with the impeller, create a pressure at the rear portion thereof to force the leakage fluid through the openings 17 to the front side of the impeller where it passes out between the blades 14 as useful pressure fluid. The blades 16 therefore account for a great deal of the leakage fluid, but even so, there are small, but very important amounts, that still tend to creep along the shaft 18. The present invention is concerned more especially with this creepage fluid.

A sealing ring 20, made of graphite, or other self-lubricating material, or even a suitable metal, surrounds the shaft 18, and is contained within the cylindrical extension 6 at a position such as to abut the outer surface of the thrust collar 11. The internal diameter of the ring 20 is such as not to fit the shaft too tightly and yet fairly snug to prevent any appreciable leakage at the joint between the ring and the shaft. In operation, this ring will tend to turn with the impeller and shaft, but usually at a much slower speed since it is physically independent of the impeller and shaft. The outer diameter of the ring 20 should be such as to fit the internal diameter of the cylinder 6, but without involving any noticeable friction in case the ring 20 rotates at an appreciable speed, but considerably less than the speed of the shaft or impeller.

A hydrostatic pressure-producing mechanism generally indicated at 21 is employed for applying a uniform pressure to the sealing ring 20, and to force the latter against the thrust collar 11 at a definite predetermined pressure. Obviously, this pressure must be so gauged as to prevent any leakage, or as much as possible, along the annular bearing surface between the ring and the thrust collar, but without introducing undesirable friction at this surface. A detailed description of the pressure-producing device 21 will be given hereinafter.

Directly to the rear of the flanged cylinder 6, and substantially in line therewith there is a cylindrical housing 22. This housing terminates at the end adjoining the member 6 in a flat surface indicated at 23 which is directly opposite the surface 8 of the cylinder 6 and these surfaces can be brought into abutting relation when the housing and member are bolted together by any well known form of clamping mechanism. As the piston and weight can be elevated only to a predetermined height determined by the position of this opening.

The cylindrical member 31 is provided with an annular shoulder indicated at 60 which fits into a shouldered recess in the housing 22. This shouldered portion is provided to accommodate a circular groove 61 about the member 31, this groove being in axial alignment with the opening 47. A plurality of diagonally directed openings 62 extend between the groove 61 and the annular slots 34. Consequently, assuming that the entire interior of the chamber 48 is filled with lubricant through the fitting 49 and the washer 52 are moved upwardly as far as the opening 58, it follows that the opening 47, the circular groove 61 and the annular slots 34, also the inner ends of the grooves 32, 33 are filled with the lubricant or other fluid. The weight 55 acting downwardly through gravity applies a constant pressure to the fluid in the compartment 48 and this pressure is transmitted through the liquid mass to the inner ends of the circular tongues 35, 39. This pressure operates in both endwise directions so that the total pressure applied to the block 36 against its collar 37 and the total pressure applied to block 40 against the graphite ring 20 are equal assuming that the areas of the end faces of the tongues 35a and 39 are equal. As long as the weight 55 is in a floating condition, i. e. forcing the plunger 51 downwardly against the fluid entrapped within the tubular member 45, hydrostatic pressure is assured on both of the pressure blocks 36, 40.

As stated hereinbefore, when the pressure block 40 is pressed against the sealing ring 20 the latter is caused to press against the thrust collar 11 of the impeller. The joint between the sealing ring and thrust collar becomes so tight as to prevent all, except the minutest amount of fluid from the impeller casing, from passing the sealing ring. The travel of this fluid may be quite slow, but may be accentuated in case the pressure of the fluid delivered by the pump is increased. Should any leakage fluid gain access past the sealing ring 20, it may travel along the large diameter portion of the shaft 18 because a small clearance has been deliberately left between the member 31 and the shaft in order to reduce friction.

This creepage fluid would then have to pass the rather snug joint between the pressure block 36 and the shaft but in order to continue its travel along the shaft in the direction of the bearings it would have to pass through the joint between the block 36 and the immediately adjacent thrust bearing surface of the collar 37. But due to the fact that hydrostatic pressure is being continuously applied to the circular tongue 35a, this joint is made so tight, but without any undue friction, that no fluid, either in vapor or liquid form can pass beyond the thrust joint. The latter is also beneficial in preventing any oil from creeping out of the circular slots 34, along the tongue 35a to travel beyond the thrust collar 37. This thrust collar can be nicely adjusted in the longitudinal direction so as to take the wear at the thrust bearing by simply loosening the screw 38 and moving the collar to its proper position. The over-hanging lip 28 may be provided with one or two vertical slots if desired to permit access to the screw 38. One of the purposes of the lip 28 is to provide protection to the joint between the stationary block 36 and the rotating collar 37.

It is apparent that the blocks 36 and 40 together with the interposed pressure-producing devices remain stationary whereas the collar 37 rotates with the shaft and the sealing ring 20 tends to precess about the shaft at its own speed, but in any case rotating with respect to the block 40. In order to assure that the member 31 remains stationary, a pair of pins 62a may be driven through oppositely disposed webs 35 (Fig. 3) and be loosely received in openings which extend through the end surfaces of the circular tongues 35a and 39. The number 31 which carries these pins is held against rotation by being secured in any suitable manner to the housing 22 at the circular recess 60.

While it is preferred to depend solely on the weight 55 and resulting hydrostatic pressure to apply the necessary thrust against the collar 37 and the sealing ring 20, if desired, the size of the weight may be reduced and combined with springs positioned lengthwise and bearing against the web 35 for introducing additional lengthwise pressure against the tongues 35a and 39.

From the foregoing it is evident that there is disclosed, in effect, an expansive link member comprising the elements 31, 35a and 39 together with the terminating blocks 36 and 40, and in which the parts of this link member are caused to separate or expand in the longitudinal direction due to hydrostatic pressure of a constant amount exerted by the effect of weight 55. This pressure acts equally throughout the entire periphery of the tongues 35a and 39 so that the pressures are balanced and no unbalanced friction is introduced at the thrust surfaces. The stationary-rotary joint at the collar 37 and sealing ring 20 is made so effective by the application of hydraulic pressure that these joints constitute practically a hermetic seal, absolutely preventing even the smallest amount of fluid from the impeller or oil from the tubular member 45 from reaching the shaft beyond the collar 37. Thus the bearings in which the shaft is journaled are left completely free of fluid of any type, even in case the impeller of the pump is rotated at such a high speed as to provide an enormous fluid pressure. It is further apparent that the position of the weight 55 serves as a tell-tale in showing at a glance whether the oil contents of the chamber 48 has been depleted and therefore is in need of additional oil.

While I have described my invention more particularly in connection with a centrifugal pump for handling corrosive fluid, it is evident that the improved seal has application to any fluid pressure apparatus, and any kind of fluid in which it is necessary to prevent creepage of the fluid at high pressure along any given surface. Moreover, the outwardly expansible link constituted of members 36, 31, 40 and their cooperating barriers 37 and 20 can be applied when properly shaped to flat surfaces.

It is of course understood that the present invention is by no means limited to the specific construction shown in the drawings but also embraces any modifications within the scope of the appended claims.

Having thus explained my invention, what I claim as new and desire to secure by Letters Patent, is:

1. A seal for a fluid pressure pump having a casing, a pump shaft and an impeller secured thereto, each of said impeller and shaft being provided with a thrust collar spaced from one another, said seal comprising a pair of annular pistons illustrated, this mechanism may comprise suitable webbed portions 24 which are slidably received by the outer surface of the member 6 and contain openings for receiving a plurality of equidistantly spaced bolts 25. The clamping members are readily removable when the bolts are loosened and therefore are easily placed in position, the bolts when tightened, serving to pull the members 24 to the left so that the left hand curved surfaces contact the flange 7 of the member 6 to provide a clamping abutment. The other end of the bolts 25 are received in a webbed portion 24, formed integral with the housing 22 so that by tightening the nuts 27, the housing 22 and the member 6 can be securely clamped together in end-wise relation. The housing 22 is provided with overhanging lip 28, the purpose of which will be pointed out hereinafter. The lower side of the housing is provided with a downwardly extending hollow boss, or projection 29 of spherical configuration and provided with a screw 30. The purpose of this boss is to provide an easily accessible drain for any fluid that may collect at this position, and particularly the fluid that is used in connection with the hydrostatic pressure-producing device 21. This fluid can be drawn by simply removing the screw 30.

A consideration of the drawings will show that there is a large annular space between the shaft 18 and each of the housing 22 and the cylindrical member 6. Within this space there is contained a hydraulically expansive link mechanism which is so constructed and designed that when it is elongated end-wise, pressure is applied at its ends to the sealing surfaces which prevent any leakage or even creepage of corrosive fluid from the impeller along the shaft, regardless of the considerable pressures developed by the high velocity pump.

This expansible link element may comprise an elongate cylindrical metal member 31, having symmetrically disposed circular grooves 32, 33 at the edge surfaces, these grooves extending for only a limited depth, and being of a continuous character. The metal which bridges the lower ends of these grooves also contains a plurality of oppositely disposed annular openings or slots 34 (Fig. 2), these openings being separated from one another by means of metal webs 35 formed integral with the member 31.

The groove 32 slidably receives the tongue 35a of a metal pressure block 36. The tongue and block are formed as rings and the inner diameter of the block 36 is of a size as to be readily slidable over the shaft 18 so as not to rotate with the shaft and yet prevent any undue leakage, either of the pumped fluid or of the oil employed in the device 21, along the shaft. This pressure block bears against a shouldered collar 37, which is adjustably secured, as indicated at 38, to one of the shouldered portions of the shaft 18. When pressure is applied in the manner to be described hereinafter to the right hand edge of the cylindrical tongue 35a, the pressure block 36 is caused to slide along the shaft 18 and to form an effective liquid and gas seal at the joint between the block and the right hand edge of the thrust collar 37.

At the opposite end of the ring member 31 there is also a cylindrical tongue 39, which is slidably received by the annular groove 33, this tongue terminating in a cylindrical pressure block 40 which bears against the graphite sealing ring 20. The block may be provided at its outer edge with a shouldered portion 41 so as to leave a bearing or thrust surface comparable to the adjacent surface of the sealing ring which may be chamfered as indicated at 42. One or more openings 43 may radially extend through the member 6 in line with the outer surface of the block 40 which can be used to visually observe the longitudinal position of the block 40, and therefore determine the approximate wear on the graphite sealing ring 20. The grooved cylindrical member 31, and also the pressure blocks 36 and 40 may, if desired, be made of a noncorrosive metal such as silicon-iron since only the thrust bearing surfaces need be true and smooth and the tongues 35a, 39 need not necessarily be machined. It will be understood that the grooves 32, 33 in the member 31 serve merely as guides for the tongues 35a and 39, and closeness of fit while desirable, is not particularly essential. Hence these members 36, 31 and 40 can be cast of unmachinable metal if desired, and the critical bearing surfaces can be ground.

In accordance with the principles of my invention the hydrostatic pressure is applied simultaneously to the tongues 35a, 39 in order to cause the link to expand endwise and to apply pressure against the thrust collar 37 and the sealing ring 20. For this purpose there is provided on the cylindrical housing 22 an upstanding cylindrical boss 43a which has a vertical threaded opening 44 for receiving the lower end of an upstanding tubular guide member 45. The neck portion 46 of this guide member is provided with a centrally positioned opening 47 which communicates with the chamber 48 of the member 45. This member 45 is provided at any suitable position with a grease or oil fitting 49 threaded into a side opening and communicating with the compartment 48. This fitting may be of the so-called Alemite type using a spring urged check valve 50 which, when depressed, by a grease gun freely admits lubricant through the fitting and into the interior of the member 45.

Within the compartment or chamber 48, there is a piston 51 having a cup shaped washer 52 screwed thereto as indicated at 53 and this piston terminates at the top in a threaded shank 54. A heavy weight 55 of metal provided with a necked down portion 56 is suspended on the shank 54 of the piston and held in position by a nut 57. The interior diameter of the weight 55 is somewhat larger than the diameter of the guide member 45 so as to eliminate all friction. The arrangement is such that as the piston 51 is moved upwardly, as will be described presently, the weight 55 is elevated to a corresponding distance. It is apparent that the weight serves normally to press the plunger 51 downwardly and to apply hydrostatic pressure to the lubricant contained within the compartment 48 and introduced through the fitting 49.

When filling the guide member 45, the piston 51 is elevated, as explained above, carrying with it the weight 55 and in order to limit the amount of lubricant that can be forced into the compartment 48 an opening 58 is provided in the wall of the cylinder or guide member 45. As the piston moves upwardly due to the introduction of the lubricant or other fluid the opening is uncovered by the weight member 55. If the lower edge of the weight member and the washer 52 are at approximately the same level the opening 58 will be in communication with the compartment 48 at one end thereof and open to the atmosphere at the other end. Thus the excess lubricant will be forced outwardly through the opening so that loosely surrounding said shaft and abutting the respective thrust collars, an annular cylinder block between said pistons and into which they extend and means for applying hydrostatic pressure simultaneously to both of said pistons within said block to urge them in opposite directions thereby to provide a fluid tight joint between each piston and its thrust collar.

2. A seal for a fluid pressure pump having a casing, a pump shaft and an impeller secured thereto, each of said impeller and shaft being provided with a thrust collar spaced from one another, said seal comprising a pair of annular pistons abutting the respective thrust collars, a cylinder block between said pistons having annular cylinders into which said pistons extend, said pistons and block loosely surrounding said shaft, and means for applying hydrostatic pressure simultaneously to both of said pistons in order to provide a fluid tight joint between each thereof and its thrust collar, said hydrostatic pressure applying-means constituting means for supplying fluid under substantially constant pressure to said cylinders.

3. A seal for a fluid pressure pump having a casing, a pump shaft, and an impeller secured thereto, means for preventing fluid from the impeller travelling along the pump shaft, said means including a pair of thrust collars, one of which is integrally secured to the impeller and the other of which is adjustably secured to the shaft, a pressure-producing device surrounding the shaft and located between said collars, said device including a pair of pressure blocks, portions of which are contained in annularly shaped compartments, and means for applying hydrostatic pressure to each of said portions in order to move them, together with the pressure blocks, outwardly endwise so as to effect a fluid seal at each of said collars.

4. A seal for a fluid pressure pump having a casing, a pump shaft and an impeller secured thereto, said impeller being provided with a thrust collar, said seal comprising a sealing ring loosely mounted about the shaft and in abutting relation to said thrust collar, said seal also including a thrust collar secured to the shaft and spaced from said first mentioned thrust collar, a second ring also loosely mounted about the shaft and abutting said thrust collar thereon, and means for applying a continuous pressure to said sealing rings to urge them toward their respective thrust collars, said means including a cylinder block between said rings and into which they extend, a confined body of fluid contained within a chamber, a weighted piston within said chamber and a connection between said chamber and the ends of said rings within said block for applying the pressure of said piston throughout its travel to each of said sealing rings.

5. A seal for a fluid pressure pump having a casing, an impeller therein mounted on a shaft, means for preventing leakage of pump fluid along the shaft, said means including a thrust bearing surface on the impeller, and a thrust collar on the shaft spaced from said thrust bearing surface, a cylinder block between said bearing surface and collar and including annular cylinders opening therefrom in opposite directions, an annular piston in each said cylinder, and means for supplying the closed ends of said cylinders with fluid under pressure whereby said pistons are urged end-wise in opposite directions, said liquid serving to apply pressure to the inner ends of said pistons throughout their entire periphery and to move them toward said thrust bearing surface and thrust collar whereby fluid tight joints are provided at these positions.

6. A seal for a fluid pressure pump having a casing, an impeller therein mounted on a shaft, means for preventing leakage of pump fluid along the shaft, said means including a thrust bearing surface on the impeller, and a thrust collar on the shaft spaced from said thrust bearing surface, means for applying pressure against said thrust bearing surface and against said thrust collar, said means including a chamber containing a confined body of liquid and a piston, a weight attached to said piston which serves to impart pressure to said liquid, a pair of cylindrical pistons surrounding the shaft and interposed between said bearing surface and thrust collar said pistons being adapted to be moved end-wise in opposite directions, said liquid serving to apply pressure to the inner ends of said pistons throughout their entire periphery to force the pistons toward said thrust bearing surface and thrust collar so as to provide fluid tight joints at these positions, and a vent opening in said chamber at an intermediate position of a length thereof to prevent the introduction of excess liquid into said chamber.

7. A seal for a fluid pressure pump having a casing with a hub, an impeller in said casing and a shaft extending from said impeller through said hub, means for preventing leakage of pump fluid along the shaft, said means including a thrust bearing surface on the impeller and a thrust collar on the shaft spaced from said thrust bearing surface, means for applying pressure against said thrust bearing surface and against said thrust collar, said means including a chamber containing a confined body of liquid and a piston, a weight attached to said piston which serves to impart pressure to said liquid, a pair of cylindrical pistons surrounding the shaft and interposed between said bearing surface and thrust collar, a cylindrical body between said pistons and into which they extend, means hydraulically connecting said block with said chamber to apply pressure to the inner ends of said pistons throughout their entire periphery to force the pistons toward said thrust bearing surface and thrust collar so as to provide fluid tight joints at these positions, and means associated with said chamber to prevent excess fluid from being supplied thereto.

DELBERT E. JACK.

REFERENCES CITED

The following references are of record in the file of this patent:

UNITED STATES PATENTS

| Number | Name | Date |
|---|---|---|
| 574,353 | Garlock | Dec. 29, 1896 |
| 1,835,877 | Joyce | Dec. 8, 1931 |
| 1,859,039 | Joyce | May 17, 1932 |
| 1,924,407 | LaBour | Aug. 29, 1933 |
| 2,306,219 | McManus | Dec. 22, 1942 |
| 2,364,133 | De La Rosa | Dec. 5, 1944 |
| 2,409,125 | Jacobsen | Oct. 8, 1946 |

FOREIGN PATENTS

| Number | Country | Date |
|---|---|---|
| 29,624 | France | 1925 |